No. 729,721. PATENTED JUNE 2, 1903.
H. W. BLAISDELL.
APPARATUS FOR CLEANING SAND FILTER BEDS.
APPLICATION FILED MAY 3, 1902.
NO MODEL. 6 SHEETS—SHEET 2.

Fig. 2.

WITNESSES: Sydney E. Taft. William N. Forrest.

INVENTOR: Hiram W. Blaisdell
By his Attorney, Charles L. Gooding

No. 729,721. PATENTED JUNE 2, 1903.
H. W. BLAISDELL.
APPARATUS FOR CLEANING SAND FILTER BEDS.
APPLICATION FILED MAY 3, 1902.
NO MODEL. 6 SHEETS—SHEET 4.

No. 729,721. Patented June 2, 1903.

UNITED STATES PATENT OFFICE.

HIRAM W. BLAISDELL, OF YUMA, ARIZONA TERRITORY.

APPARATUS FOR CLEANING SAND FILTER-BEDS.

SPECIFICATION forming part of Letters Patent No. 729,721, dated June 2, 1903.

Application filed May 3, 1902. Serial No. 105,779. (No model.)

*To all whom it may concern:*

Be it known that I, HIRAM W. BLAISDELL, a citizen of the United States, residing at Yuma, in the county of Yuma and Territory of Arizona, have invented new and useful Improvements in Apparatus for Cleaning Sand Filter-Beds, (Case D,) of which the following is a specification.

This invention relates to an improved apparatus for cleansing the surface of the sand composing the bed of filters used in purifying the supply of water to cities and towns. These filters are of various kinds, but are usually laid out in a series of beds made of sand and inclosed by walls running longitudinally and transversely thereof. The water is introduced into the basin formed by the said walls and filters through the sand forming the filter-bed, thus leaving upon the surface of the sand the impurities previously contained in the water-supply. These impurities in time form a film or crust upon the upper surface of the sand, and the sand near the upper surface becomes covered with impurities, which interferes with the efficiency of the filter-bed, and it becomes necessary to remove this film or crust and to cleanse the sand upon the surface of the bed. As these filter-beds are of large area, to do this work of cleansing the surface without the aid of machinery or mechanical apparatus involves an enormous amount of labor and expense; and it is the object of this invention to provide an apparatus which will thoroughly remove the film or crust from the surface of the bed and also cleanse the sand upon the upper surface from the impurities hereinbefore set froth.

It is the further object of this invention to provide a strong, simple, and durable machine for the purpose hereinbefore set forth and to provide a machine which shall be adapted to follow the inequalities of the surface of the filter-bed and to remove the impurities therefrom, together with a thin layer of sand.

It is still further the object of this invention to provide a machine for the purpose specified which shall be adapted to cleansing the surface of filter-beds in which ice is formed upon the surface of the water in said filter-beds.

The invention consists, in an apparatus of the character described, of a vertical suction-pipe, a scraping-chamber, a horizontal suction-pipe connecting said vertical suction-pipe and scraping-chamber, and mechanism to rotate said vertical suction-pipe.

The invention further consists in a vertical suction-pipe, a scraping-chamber connected therewith and provided with an opening in the bottom thereof, a scraper, the cutting edge of said scraper forming one side of said opening, mechanism to carry said scraping-chamber over the surface of said filter-beds, and mechanism to revolve said scraping-chamber.

The invention again consists in the particular construction of scraping-chamber set forth in the claims.

The invention still further consists in a vertical suction-pipe, a carrier-frame fast thereto, a scraping-chamber supported upon said carrier-frame, and a float fast to said carrier-frame, for the purpose specified.

The invention again consists in a vertical suction-pipe, a scraping-chamber connected thereto, mechanism to rotate said suction-pipe, a suction-pump to pump water and the impurities from the surface of the filter-bed, and a conveyer to convey said impurities, together with a portion of the sand of the filter-bed, from the cleansing apparatus to a point outside the filter-bed.

The invention again consists, in an apparatus of the character described, of mechanism for cleansing the surface of a filter-bed supported upon a carriage adapted to travel over the surface of said filter-bed and having supported thereon a mechanism for cutting a slot through the ice which covers the surface of the water in the filter-beds in advance of said cleansing apparatus.

The invention finally consists in the combination and arrangement of parts set forth in the following specification and particularly pointed out in the claims thereof.

Referring to the drawings.

Like numerals refer to like parts throughout the several views of the drawings.

In the drawings, 15 represents a sand filter-bed in transverse section, in which 16 17 are the side walls, 18 the sand composing the surface of the filter-bed, and 19 the water which is to be purified by filtration. The apparatus is directly supported upon a supplementary carriage 20, said carriage 20 being provided with wheels 21, which run upon tracks 22, provided upon the main carriage 23. The main carriage 23 is provided with wheels 24, which run upon tracks 25 25, provided upon the upper surface of the walls 16 17. It will be seen that the main carriage 23 moves lengthwise of the filter-bed upon the tracks 25, provided upon the walls 16 17, and that the supplementary carriage upon which my improved mechanism is directly supported may be moved crosswise of the filter-bed upon the tracks 22, which extend lengthwise of the main carriage 23, but transversely of the filter-bed, and thus it will be seen that my improved apparatus may be moved lengthwise and transversely of the filter-bed, as desired.

Figure 1:
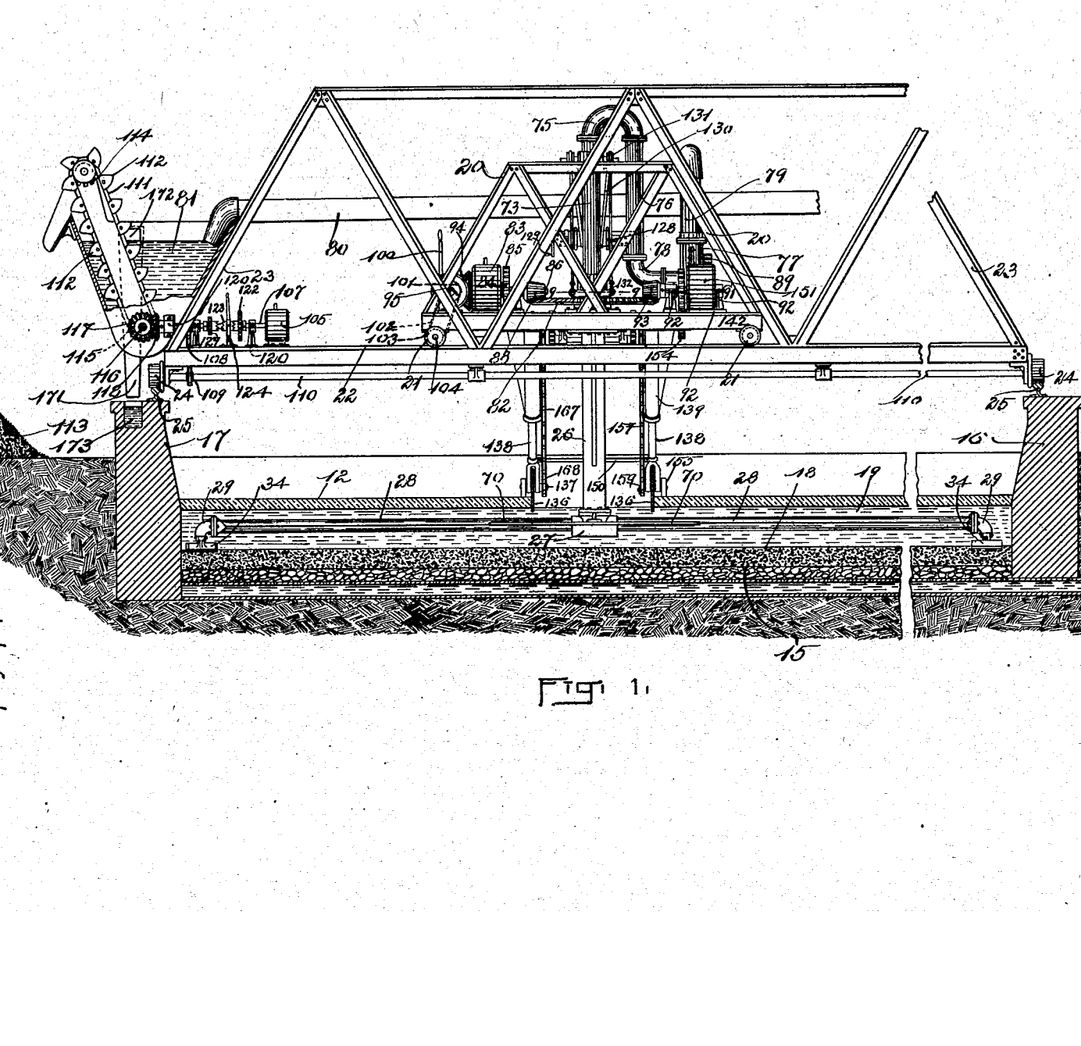
Figure 1 is a transverse section taken through a sand filter-bed, showing the surface of the water in said filter-bed covered with ice and showing my improved apparatus in front elevation, partly broken away and shown in section, the whole apparatus being shown operatively located in connection with said filter-bed.
Figure 2:
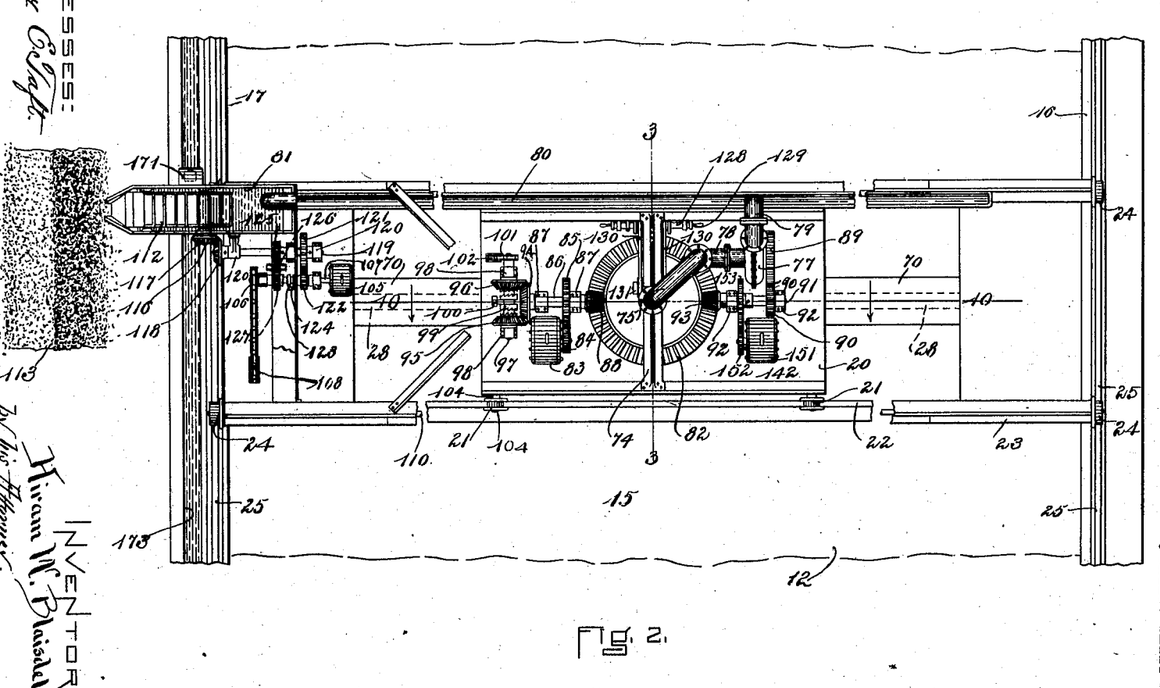
Fig. 2 is a plan view of my improved cleansing apparatus with a portion of a filter-bed shown in connection therewith.
Figure 5:
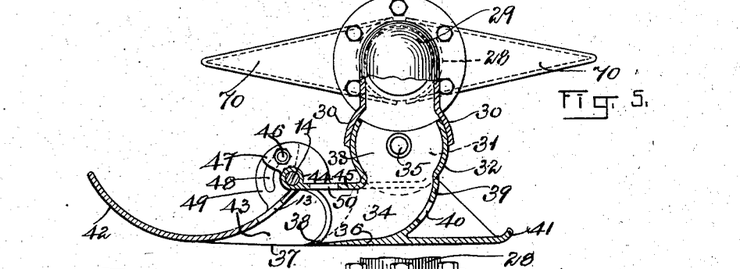
Fig. 5 is an end view of a portion of the carrier-frame with a float attached thereto, one of the scraping-chambers being shown in vertical section attached thereto.
Figure 6:
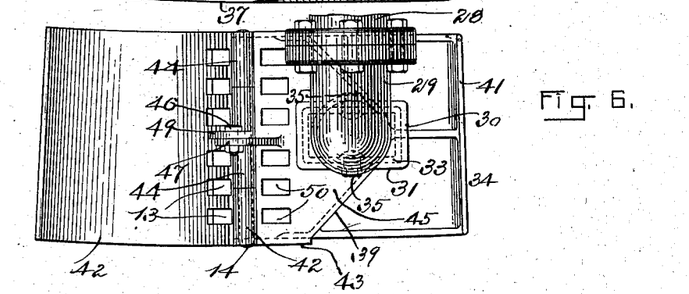
Fig. 6 is a plan view of one of the scraping-chambers.

It is essential in apparatus of the character described that the cleansing device should be moved over the whole surface of the bed, that it should be capable of following the undulating surface of said bed without changing materially the relation of the working parts thereto, that it should be capable of being raised and lowered bodily, and, further, that the upper surface of the sand, together with the film or crust thereon, should be removed from the bed and conveyed from the surface of the bed to a point outside the said filter-bed, and in addition that a slot should be cut in the ice covering the surface of the water in said filter-bed in advance of the apparatus which performs the cleansing of the surface of the sand. To attain these results, I provide, primarily, a vertical suction-pipe 26. To the lower end of said suction-pipe 26 is fastened a carrier-frame 27. A horizontal suction-pipe 28 is fast to opposite sides of said carrier-frame, Fig. 1, and to each of said horizontal suction-pipes is attached at its outer end an elbow 29. The elbow 29, Figs. 5 and 6, has curved flanges 30 30 upon the vertical arm thereof and straight vertical side flanges 31 31, said flanges 30 and 31 being formed to receive the curved flanges 32 and straight side flanges 33, formed upon a scraping-chamber 34. The side flanges 31 and 33 are joined together by bolts 35, the axial center of the bolts 35 being coincident with the center from which the curved flanges 30 and 32 are described, so that it will be seen that the scraping-chamber 34 is free to rock upon the bolts 35 as a center.

The bottom 36 of the scraping-chamber 34 is provided with an opening 37, the rear edge 38 of said opening being sharpened to provide a cutting edge. The rear wall 39 of the chamber 34 is provided with openings 40 to admit water from the surface of the filter-bed to the interior of the scraping-chamber. The bottom 36 of said scraping-chamber is extended rearwardly and curved up slightly at its extreme rear end, forming a rear guide-plate 41. The front wall of the scraping-chamber 34 is extended forwardly and curved upwardly, forming a guide-plate 42, having two vertical side flanges 43 integral therewith and pivotally attached by a rod 14 to ears 44, formed upon the upper wall 45 of the chamber 34.

The guide-plate 42 is provided with openings 13, through which water may enter from the surface of the filter-bed. The said guide-plate 42 is adjustably fastened to the chamber 34 by means of a bolt 46, which is fastened to a flange 47, formed upon the top 45 of the scraping-chamber, and passes through a slot 48, provided in an ear 49 integral with said guide-plate 42. By adjusting the guide-plate 42 in relation to the chamber 34 and to the cutting edge 38 the opening 37 may be made larger or smaller, as desired, and the thickness of crust removed from the surface of the sand, as hereinafter set forth, may be increased or diminished, as may be desired. The upper front wall 45 of the chamber 34 is provided with openings 50 to admit water from the surface of the filter-bed to the interior of the chamber 34.

Figure 7:
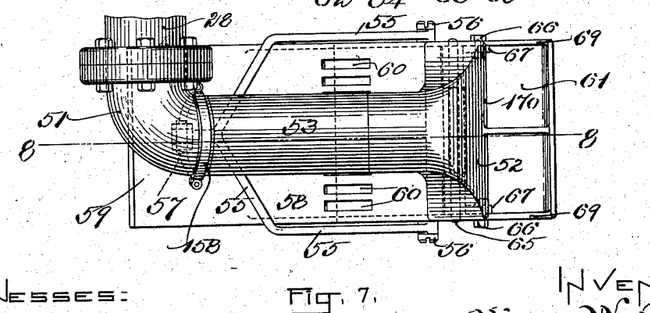
Fig. 7 is a plan view of a modified form of scraping-chamber.
Figure 8:
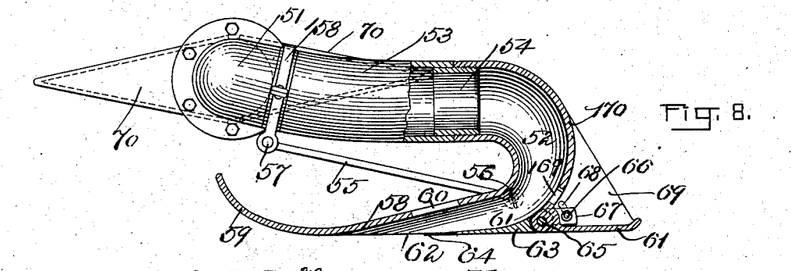
Fig. 8 is a vertical section, partly in elevation, taken on line 8 8 of Fig. 7, showing a portion of the carrier-frame in end elevation, together with the float which is attached thereto, and showing the scraping-chamber with its guide-plates in section.
Figure 9:
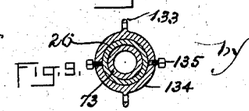
Fig. 9 is a section taken on line 9 9 of Fig. 1.

In Figs. 7 and 8 is illustrated a modified form of scraping-chamber, in which an elbow 51 is connected to the outer ends of the horizontal suction-pipes 28 and has a scraping-chamber 52 connected thereto by a flexible pipe 53, said flexible pipe being joined to the chamber 52 by a screw-threaded sleeve 54. The elbow 51 is also connected to the chamber 52 by a forked brace-rod 55, fastened by screws 56 to each side of the chamber 52, and by a pin 57 to a collar 158, said collar being clamped to the elbow 51 and said rod 55 transmitting the strain caused by the movement of the horizontal suction-pipes 28 in carrying the scraping-chambers over the surface of the filter-bed. The chamber 52 is provided with a front wall 58, extended forwardly and curved upwardly to form a guide-plate 59 and being provided with openings 60 to admit water from the surface of the filter-bed to the interior of the chamber 52. In the rear wall 170 of said chamber 52 are provided openings 169, through which the water from the surface of the filter-bed may enter into the interior of said scraping-chamber 52. The bottom 61 of the chamber 52 is provided with an opening 62 therein, and in said opening 62 is located a scraper or knife 63, provided with a cutting edge 64, said scraper being pivoted upon a pin 65, fast to the chamber 52. The scraper 63 is, moreover, adjustably attached to the chamber 52, so that it may be set at different angles therewith by means of bolts 66, each fast to an ear 67, integral with said scraper, and projecting through a slot 68, provided in a rib or side wall 69, formed upon the chamber 52.

It is evident that the scraper 63 may be adjusted so as to vary the relative position of the edge 64 to the guide-plate 58 and chamber 52 by loosening the clamp-bolts 66, tipping said scraper upon its pivot-pin 65, and then clamping said scraper in position by means of the bolts 66 and the ears 67. The object of this adjustment of the scraper is to remove a greater or less thickness of film or crust from the surface of the sand bed. If the cutting edge 64 is lowered, Fig. 8, a greater thickness of crust will be removed from the surface of the sand, and vice versa.

In order to assist the operation of the scraping-chamber and of the parts which impart a rotary motion to the suction-pipe 26 and revolve the scraping-chamber fast to the carrier-frame 27, I provide floats 70, one of which is fastened to each of the horizontal suction-pipes 28 and to the carrier-frame 27. The vertical suction-pipe 26 is guided in its rotary and vertical movements by a bearing 71, provided in the supplementary carriage 20, through which said vertical suction-pipe extends. The upper end of the vertical suction-pipe 26 is provided with a stuffing-box 72, which encircles a stationary suction-pipe 73. The stationary suction-pipe 73 forms an additional means to guide and support the vertical suction-pipe 26, said stationary suction-pipe being rigidly attached to a cross-frame 74, fast to the supplementary carriage 20. The upper end of the pipe 73 is joined by a connection 75 to a vertical pipe 76, said vertical pipe being in turn connected to a centrifugal suction-pump 77 by an elbow 78. The suction-pump 77 is provided with an outlet-pipe 79, which empties into a channel 80, fast to the main carriage 23 and arranged to empty into a chamber 81, fast to said main carriage 23.

The vertical suction-pipe 26 is rotated by means of a bevel-gear 82, to which it is splined. The bevel-gear 82 is rotated by means of an electric motor 83, supported upon the supplementary carriage 20 and operatively connected to said bevel-gear by a spur-gear 84, fast to the driving-shaft of said motor and meshing into a spur-gear 85, fast to a shaft 86, which rotates in bearings 87 upon the supplementary carriage 20 and has fastened to one end thereof a bevel-gear 88, which meshes into the bevel-gear 82. The centrifugal pump 77 is driven by a spur-gear 89, which meshes into a spur-gear 90, fast to a shaft 91, which rotates in bearings 92 upon the supplementary carriage 20 and has fast to one end thereof a bevel-gear 93, which meshes into the bevel-gear 82. The electric motor 83 also supplies the necessary power to move the supplementary carriage 20 lengthwise of the main carriage 23 upon the tracks 22, said motor 83 being connected to impart rotary motion to the shaft 86, as hereinbefore described, and said shaft 86 having fastened to the left-hand end thereof a bevel-gear 94, which meshes into two bevel-gears 95 and 96. The bevel-gears 95 and 96 turn loosely upon a shaft 97, arranged to rotate in bearings 98 upon the supplementary carriage 20, and either of said bevel-gears may be locked to the shaft 97 by means of the clutch 99, which is operated by means of a lever 100. The shaft 97 has fastened to one end thereof a sprocket-gear 101, which is connected by means of a sprocket-chain 102 to a sprocket-gear 103, fast to a shaft 104, said shaft 104 having two of the wheels 21 fast thereto.

The main carriage 23 is propelled lengthwise of the filter-bed by means of an electric motor 105, which is supported upon said main carriage and has a sprocket-gear 106 fast to the driving-shaft 107 of said motor. The sprocket-gear 106 is connected by a chain 108 to a sprocket-gear 109, fast to a shaft 110, extending longitudinally of the main carriage and having fast at each end thereof one of the wheels 24. To propel the carriage 23 in opposite directions, the motor 105 is reversed.

The crust, impurities, and some of the sand from the surface of the filter-bed, which is scraped from the surface by the cutting edge 38 at the bottom of the scraping-chamber 34, pass into the interior of said scraping-chamber and are drawn by the suction-pump, together with water mixed therewith and entering through the openings 13, 40, and 50 in said scraping-chamber through the elbow 29, horizontal suction-pipe 28, vertical suction-pipe 26, vertical stationary suction-pipe 73, connection 75, vertical pipe 76, elbow 78, and outlet-pipe 79, to the channel 80, whence it flows into the chamber 81, and the sand and impurities hereinbefore referred to are carried therefrom by means of a conveyer-chain 111 and buckets 112 and dumped in a pile 113 outside the wall 17. The water and the impurities suspended therein, which is drawn from the surface of the filter-bed, as hereinbefore described, and delivered into the chamber 81, rises to the height of the opening 172 in the side wall of said chamber 81 and flows outwardly through said opening into and through the outlet-pipe 171, discharging into a trough 173, formed in the upper surface of the side wall 17 of the filter-bed.

The chain 111 is driven by sprocket-gears 114 and 115, the sprocket-gear 115 being fast to a shaft 116, which has a bevel-gear 117 fast thereto and meshing into a bevel-gear 118, which is fast to a shaft 119, arranged to rotate in bearings 120 upon the main carriage 23. The shaft 119 has a gear 121 fast thereto, meshing into a gear 122, which turns loosely upon the shaft 107 and is locked to said shaft by means of a clutch 123, operated by a lever 124.

In order to run the buckets always in the same direction, although the motor 105 may be reversed, as hereinbefore set forth, I provide another gear 125, fast to the shaft 119, which meshes into an intermediate gear 126, said intermediate gear in turn meshing into a gear 127, which turns loosely upon the shaft 107 and is locked thereto by the clutch 123, operated, as hereinbefore set forth, by the lever 124. By this mechanism it will be seen that the shaft 119 may be driven always in the same direction even if the motor 105 be reversed, as hereinbefore set forth.

Figure 3:
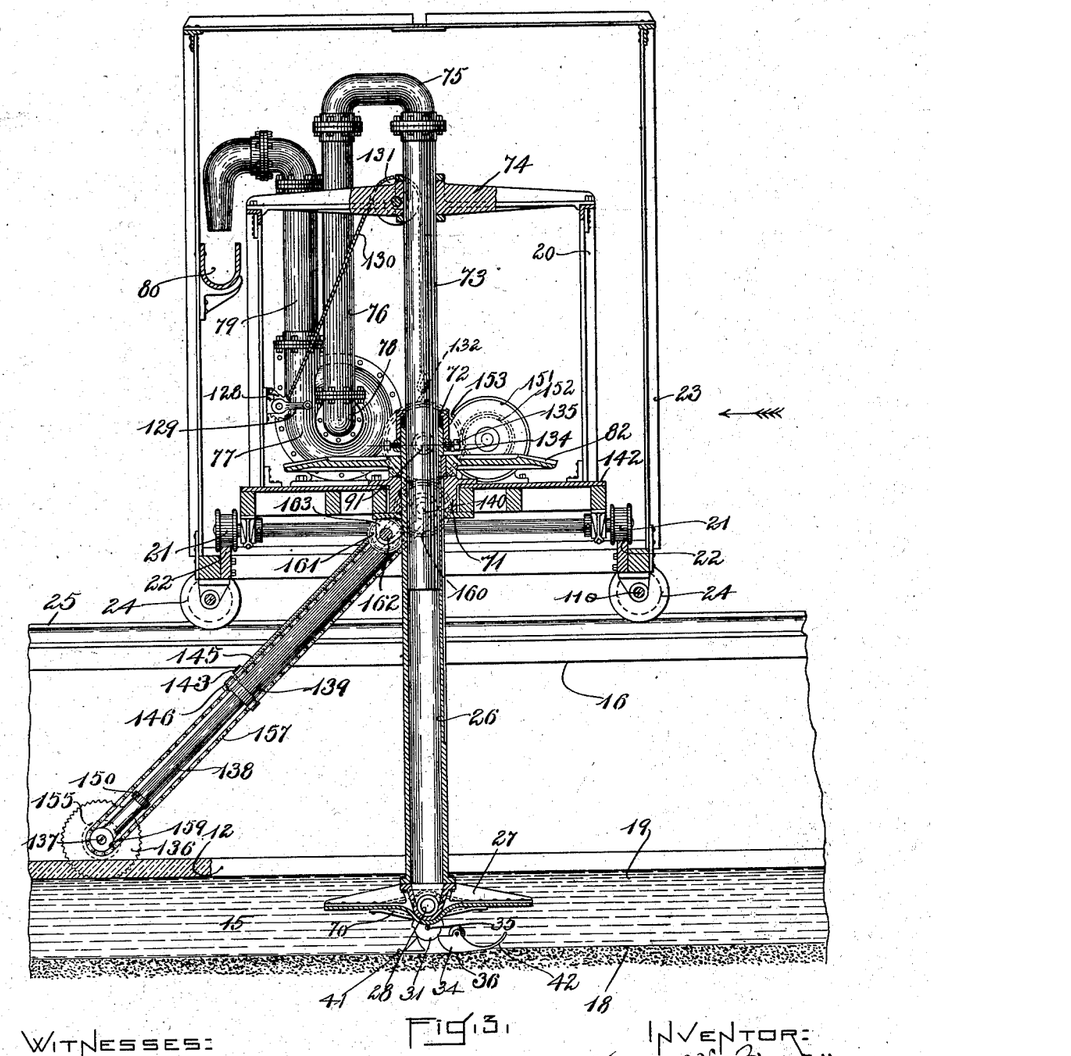
Fig. 3 is a vertical section taken on line 3 3 of Fig. 2 looking toward the right in said figure.
Figure 4:
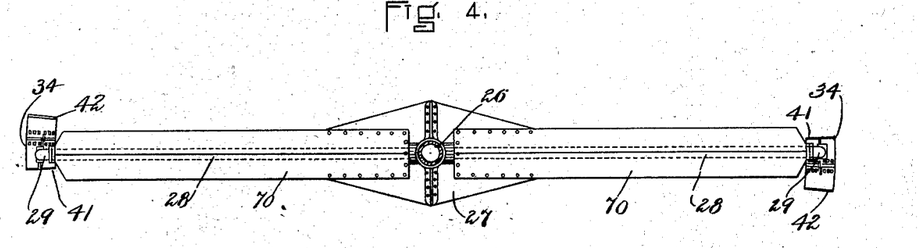
Fig. 4 is a plan of the carrier-frame and its floats, together with the scraping-chambers attached thereto.

The suction-pipe 26 and the parts attached thereto are raised and lowered by means of a windlass 128, Fig. 3, which is rotated by means of a handle 129 and has two wire ropes 130, which pass over pulleys 131 and are provided with hooks 132 to engage ears 133, formed upon a collar 134, which is fastened by set-screws 135 and stuffing-box 72 to the upper end of the suction-pipe 26.

In order to operate my improved apparatus for cleaning filter-beds when the surface of said filter-beds is covered with ice without incurring the expense and trouble of removing said ice entirely from the surface, I provide mechanism for cutting a slot through said ice in advance of the cleaning apparatus, said mechanism consisting of rotary cutters 136 136, each fast to a shaft 137, journaled to rotate in a forked carrier-slide 138. The carrier-slide 138 is fitted to slide longitudinally thereof in the arm 139, pivoted to a shaft 140, arranged to rotate in bearings 141 and 163, fast to the under side of the platform 142 of the supplementary carriage 20. Each of the forked slides 138 is provided with a boss 143, which projects through a slot 144, provided in the arm 139, said boss serving to prevent the forked slide 138 from rotating and also being interiorly screw-threaded to receive a screw 145, arranged to rotate in bearings 146 147 upon the arm 139. The screw 145 is rotated by means of a hand-wheel 148 and has a collar 149 fast thereto beneath the bearing 147, said collar 149 and hand-wheel 148 preventing the screw 145 from moving longitudinally thereof. By rotating the hand-wheel 148 and screw 145 it will be seen that through the boss 143, which is interiorly screw-threaded to receive said screw 145, the forked slide 138 and the rotary cutter thereon will be raised or lowered, as may be desired.

When the apparatus is traveling in the direction of the arrow, Fig. 3, the cutters 136 will be in the position shown—viz., to the left of the cleansing apparatus and in advance thereof. If the direction of the apparatus is reversed, it will be necessary that the cutters 136 should be moved to the right of the cleansing apparatus, Fig. 3, in order that they shall still be in advance of said cleansing apparatus, and to swing the arms 139 upon the shafts 140 to accomplish this change of location of the rotary cutters it is necessary to move said cutters toward the center of said shafts in order to clear the ice. This is done by means of the screws 145 and hand-wheels 148, Fig. 10, the cutters being drawn toward the center of the shafts 140 by rotating the said hand-wheels, and the arms 139 are then swung to the opposite side of the cleansing apparatus from that shown in Fig. 3, whereupon the cutters are again moved away from the center of the shafts 140 by means of the hand-wheels 148 and screws 145. The forked slides 138 are joined together by a tie 150, which is removed when the cutters are swung from one side of the cleansing apparatus to the other, as hereinbefore described.

Figure 10:
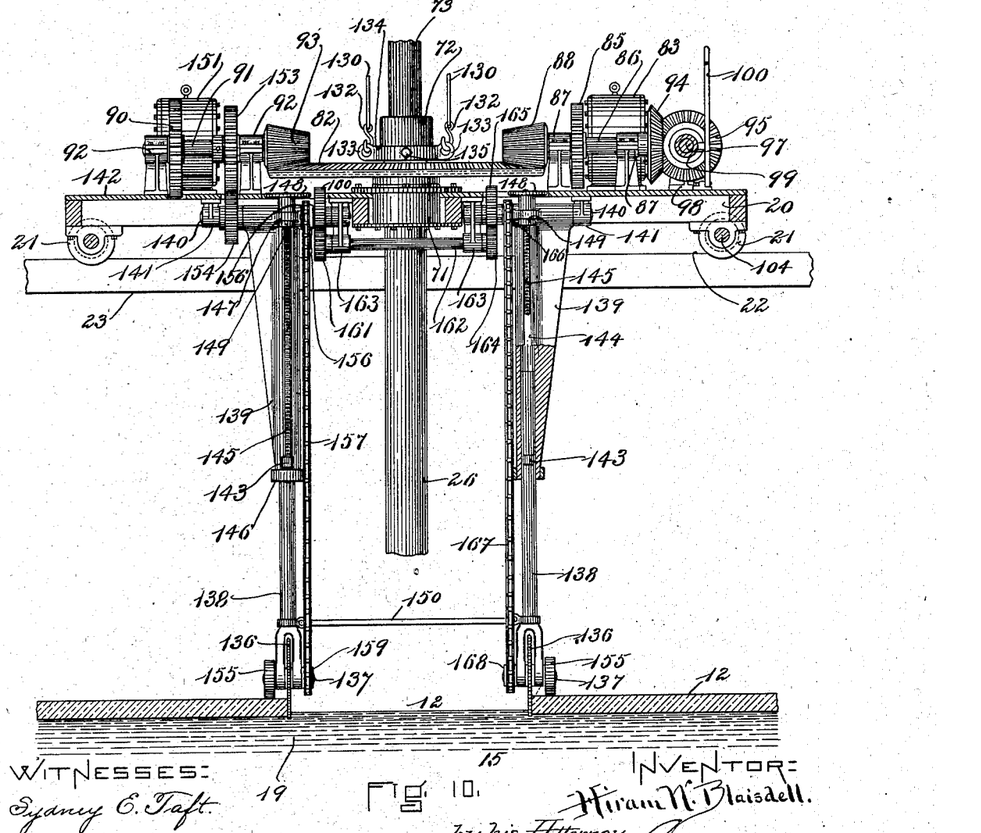
Fig. 10 is a detail sectional elevation taken on line 10 10 of Fig. 2 and viewed in the direction of the arrow in said figure or from the left of Fig. 3.
Figure 11:
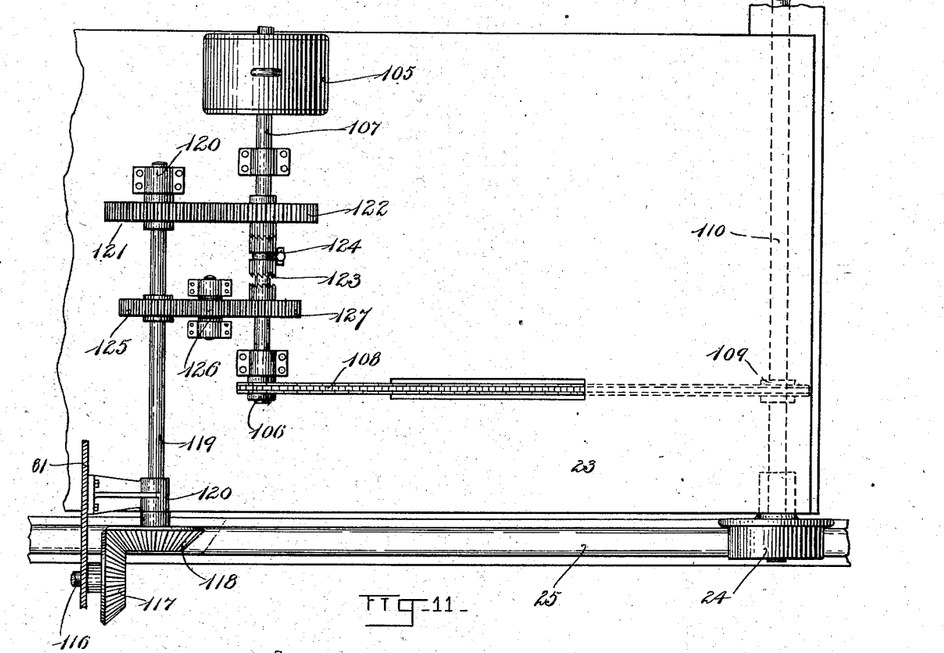
Fig. 11 is a detail plan view of a portion of the main carriage and its propelling mechanism.
Figure 12:
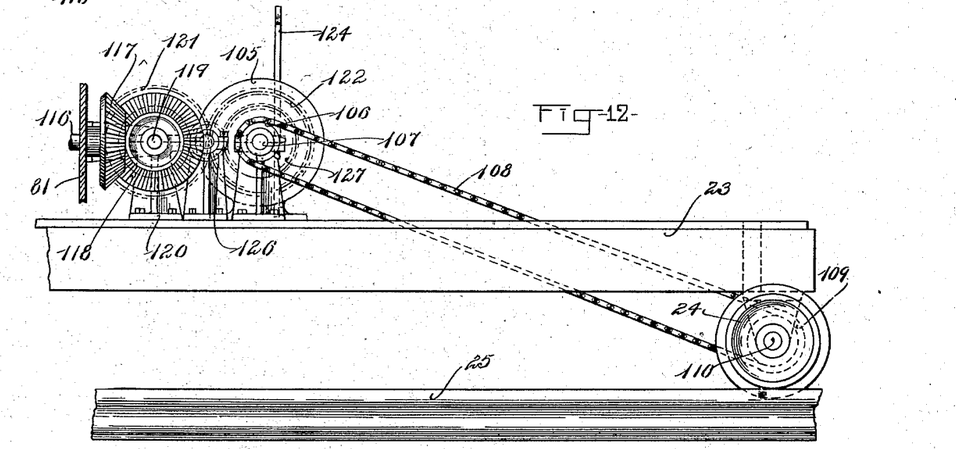
Fig. 12 is a side elevation of the parts shown in Fig. 11.

The cutter 136 at the left of Fig. 10 is driven by an electric motor 151, supported upon the platform of the supplementary carriage 20. Said motor 151 has a spur-gear 152 fast to the driving-shaft thereof and meshing into another spur-gear 153, which rotates loosely upon the shaft 91. The gear 153 meshes into another spur-gear 154, located therebeneath, Figs. 3 and 10, said gear 154 being fast to and driving the shaft 140 at the left of Fig. 10. The driving-shaft 140 has a sprocket-gear 156 fast thereto and connected by a sprocket-chain 157 to a sprocket-gear 159, fast to the shaft 137. It is evident that by reversing the electric motor 151 the direction of rotation of the rotary cutters 136 may also be reversed when the cutters are changed from one side to the other of the cleansing apparatus, as hereinbefore described. The rotary cutter 136 at the right of Fig. 10 is driven by means of a spur-gear 160, fast to the shaft 140 and meshing into a spur-gear 161, fast to a counter-shaft 162, which rotates in bearings 163 and has fastened to the opposite end from the gear 161 a spur-gear 164, which meshes into a spur-gear 165, fast to the shaft 140 at the right-hand side of Fig. 10. Said shaft 140 has a sprocket-gear 166 fast thereto, which is connected by a sprocket-chain 167 to a sprocket-gear 168, fast to the shaft 137 at the right of Fig. 10.

To regulate the position of the cutters 136 and the carrier-arms 139 and forked slides 138 with relation to the surface of the ice which is to be cut, a wheel 155 is provided, fast to the shaft 137, said wheel being adapted to rotate with the shaft 137, the periphery of said wheel resting upon the surface of the ice 12.

The general operation of my improved apparatus for cleansing filter-beds, hereinbefore described, is as follows: The main carriage 23 being located near one end of the filter-bed and the supplementary carriage in the proper position upon said main carriage to bring the scraping-chambers 34 close to one of the side walls 16 17, when said scraping-chambers are revolved, as hereinbefore described, the rotary cutters are first operated by means of the motor 151, together with the mechanism connecting said motor with said rotary cutter, as hereinbefore described. When a slot of sufficient length has been cut in the ice, the horizontal suction-pipes 28 28, with the chambers 34 attached thereto, are turned at right angles to the position shown in Fig. 1 and lowered, by means of the raising and lowering mechanism hereinbefore described, through the slot cut in the ice 12. The suction-pipe 26, together with the suction-pipes 28 and the chambers 34, is now rotated, as hereinbefore described, by the electric motor 83 and the gearing connecting said motor with the bevel-gear 82 and suction-pipe 26. The main carriage is then propelled lengthwise of the filter-bed by means of the electric motor 105 and the connecting-gearing hereinbefore described. When the apparatus has traveled the length of the filter-bed, the suction-pipes 28 28 and the parts thereto attached are turned at right angles to the position shown in Fig. 1 and drawn upwardly through the slot which has been cut in the ice. The supplementary carriage is then propelled lengthwise of the main carriage and transversely of the filter-bed by means of the electric motor 83 and connecting mechanism hereinbefore described. When the supplementary carriage has traveled a sufficient distance to bring the cleansing apparatus over a portion of the bed not previously cleansed, as hereinbefore described, the rotary cutters are reversed from the position shown in Fig. 3 to the opposite side of the cleansing apparatus, as hereinbefore described. A new slot is then cut in the ice, the scraping-chambers and suction-pipes 28 are lowered through the slot, as hereinbefore described, and the main carriage is then started lengthwise of the filter-bed by means of the electric motor 105, the scraping-chambers being rotated, as hereinbefore set forth.

It will be understood that the centrifugal suction-pump 77 is constantly operated during the motion of the main carriage lengthwise of the filter-bed, as hereinbefore described, by means of the electric motor 83 and the gearing connecting said motor to said suction-pump hereinbefore set forth. During the travel of the cleansing apparatus lengthwise of the filter-bed backward and forward, as hereinbefore described, the film or crust and a portion of the sand are removed from the surface of the filter-beds, carried through the suction-pipes 28 and 26, pipe 76, elbow 78, centrifugal suction-pump 77, and outlet-pipe 79 to the channel 80 and thence into the chamber 81, where the water separates from the sand and impurities to a large extent and flows outwardly through the opening 172, through the outlet-pipe 171, into the trough 173, thence flowing to any desirable outlet, as to a sewer-pipe. It is evident that by repeating the operations hereinbefore described the cleansing apparatus will be moved lengthwise of the filter-bed backwardly and forward until the entire width of the filter-bed has been thoroughly cleansed.

In another application made by me, entitled "Apparatus for cleaning sand filter-beds," filed May 3, 1902, Serial No. 105,776, a mixing-chamber and rake are carried directly upon a supplementary carriage, the rake being rotated about an axial center located inside said mixing-chamber, no rotary or revolving motion being imparted to the mixing-chamber itself. Said mixing-chamber is moved lengthwise and transversely of the filter-beds over the whole surface thereof by means of the main and supplementary carriages, similar to those hereinbefore described. In the structure set forth in this application a scraping-chamber is moved lengthwise of the filter-bed and transversely thereof and is also revolved about an axial center located outside said scraping-chamber.

Having thus described my invention, what I claim, and desire by Letters Patent to secure, is—

1. In an apparatus for cleaning filter-beds, a scraping-chamber, provided with an opening in the under side thereof, a scraper located in said opening and forming a bottom for said scraping-chamber, said bottom extended rearwardly therefrom and forming a rear guide-plate therefor, the front wall of said chamber extended forward thereof and curved upwardly to form a front guide-plate therefor, and openings in the front and rear walls thereof for the purpose specified.

2. In an apparatus for cleaning filter-beds, a vertical suction-pipe, a scraping-chamber, a horizontal suction-pipe connecting said vertical suction-pipe and scraping-chamber, and mechanism to rotate said vertical suction-pipe.

3. In an apparatus for cleaning filter-beds, a vertical suction-pipe, a scraping-chamber connected therewith and provided with an opening in the bottom thereof, a scraper, the cutting edge of said scraper forming one side of said opening, mechanism to carry said scraping-chamber over the surface of said filter-beds, and mechanism to rotate said vertical suction-pipe.

4. In an apparatus for cleaning filter-beds, a vertical suction-pipe, a scraping-chamber connected therewith and provided with an opening in the bottom thereof, a scraper, the cutting edge of said scraper forming one side of said opening, mechanism to carry said scraping-chamber over the surface of said filter-beds, and mechanism to revolve said scraping-chamber.

5. In an apparatus for cleaning filter-beds, a vertical suction-pipe, a carrier-frame fast thereto, a scraping-chamber supported upon said carrier-frame, a float fast to said carrier-frame, and mechanism to rotate said vertical suction-pipe.

6. In an apparatus for cleaning filter-beds, a vertical suction-pipe, a horizontal suction-pipe fast thereto, a scraping-chamber supported upon said horizontal suction-pipe, a float fast to said horizontal suction-pipe, and mechanism to rotate said vertical suction-pipe.

7. In an apparatus for cleaning filter-beds, a vertical suction-pipe, a carrier-frame fast thereto, a scraping-chamber supported upon said carrier-frame, a horizontal suction-pipe connecting said vertical suction-pipe and scraping-chamber, a float fast to said carrier-frame, and mechanism to rotate said vertical suction-pipe.

8. In an apparatus for cleaning filter-beds, a carriage; a suction-pipe, a scraping-chamber connected thereto, mechanism to rotate said suction-pipe, a suction-pump, and conveying mechanism, all supported upon said carriage; and mechanism to move said carriage over the surface of said filter-beds.

9. In an apparatus for cleaning filter-beds, a main carriage arranged to travel lengthwise of said filter-beds, a supplementary carriage arranged to travel lengthwise of said main carriage; a vertical suction-pipe, a scraping-chamber connected thereto, and a suction-pump located upon said supplementary carriage; and a conveyer mechanism located upon said main carriage.

10. In an apparatus for cleaning filter-beds, a main carriage arranged to travel lengthwise of said filter-beds, a supplementary carriage arranged to travel lengthwise of said main carriage; a vertical suction-pipe, a scraping-chamber connected thereto, mechanism to rotate said vertical suction-pipe, and a suction-pump located upon said supplementary carriage; and a conveyer mechanism located upon said main carriage.

11. In an apparatus for cleaning filter-beds, a main carriage arranged to travel lengthwise of said filter-beds, a supplementary carriage arranged to travel lengthwise of said main carriage; a vertical suction-pipe, a scraping-chamber connected thereto, mechanism to rotate said vertical suction-pipe, and a suction-pump located upon said supplementary carriage; a conveyer mechanism located upon said main carriage, mechanism to move said main carriage lengthwise of said filter-beds, and mechanism to move said supplementary carriage transversely of said filter-beds.

12. In an apparatus for cleaning filter-beds, a carriage arranged to travel over said filter-beds, a rotary cleansing apparatus, and an ice-cutting mechanism supported upon said carriage, said ice-cutting mechanism arranged to cut a slot in the ice covering said filter-beds in advance of said cleansing apparatus.

13. In an apparatus for cleaning filter-beds, a main carriage arranged to travel lengthwise of said filter-beds, a supplementary carriage arranged to travel lengthwise of said main carriage; a vertical suction-pipe, a scraping-chamber connected thereto, a suction-pump, and an ice-cutting mechanism carried by said supplementary carriage and arranged to cut a slot in the ice covering said filter-beds; and a conveyer mechanism located upon said main carriage.

14. In an apparatus for cleaning filter-beds, a main carriage arranged to travel lengthwise of said filter-beds, a supplementary carriage arranged to travel lengthwise of said main carriage; a vertical suction-pipe, a scraping-chamber connected thereto, mechanism to rotate said vertical suction-pipe, a suction-pump, and an ice-cutting mechanism carried by said supplementary carriage and arranged to cut a slot in the ice covering said filter-beds; and a conveyer mechanism located upon said main carriage.

15. In an apparatus for cleaning filter-beds, a main carriage arranged to travel lengthwise of said filter-beds, a supplementary carriage arranged to travel lengthwise of said main carriage; a vertical suction-pipe, a scraping-chamber, a horizontal suction-pipe connecting said vertical suction-pipe and scraping-chamber, mechanism to rotate said vertical suction-pipe, a suction-pump, and an ice-cutting mechanism carried by said supplementary carriage and arranged to cut a slot in the ice covering said filter-beds; and a conveyer mechanism located upon said main carriage.

In testimony whereof I have hereunto set my hand in presence of two subscribing witnesses.

HIRAM W. BLAISDELL.

Witnesses:
CHARLES S. GOODING,
ANNIE J. DAILEY.